H. O. BAKER.
VALVE GEAR.
APPLICATION FILED MAR. 17, 1919.
1,395,331.
Patented Nov. 1, 1921.
2 SHEETS—SHEET 1.
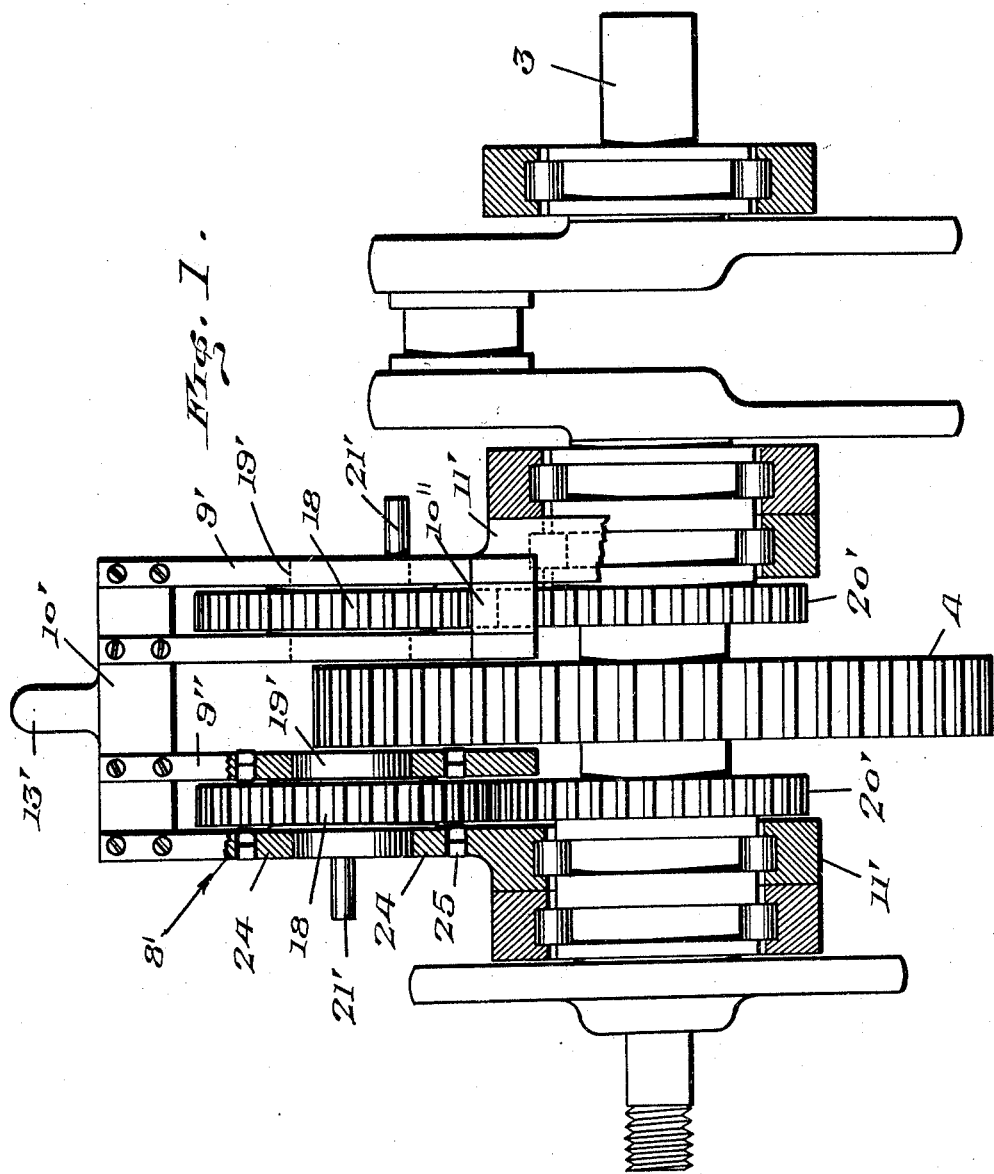
WITNESS:
INVENTOR.
Hartley O. Baker
BY
W. J. FitzGerald & Co.
ATTORNEYS.

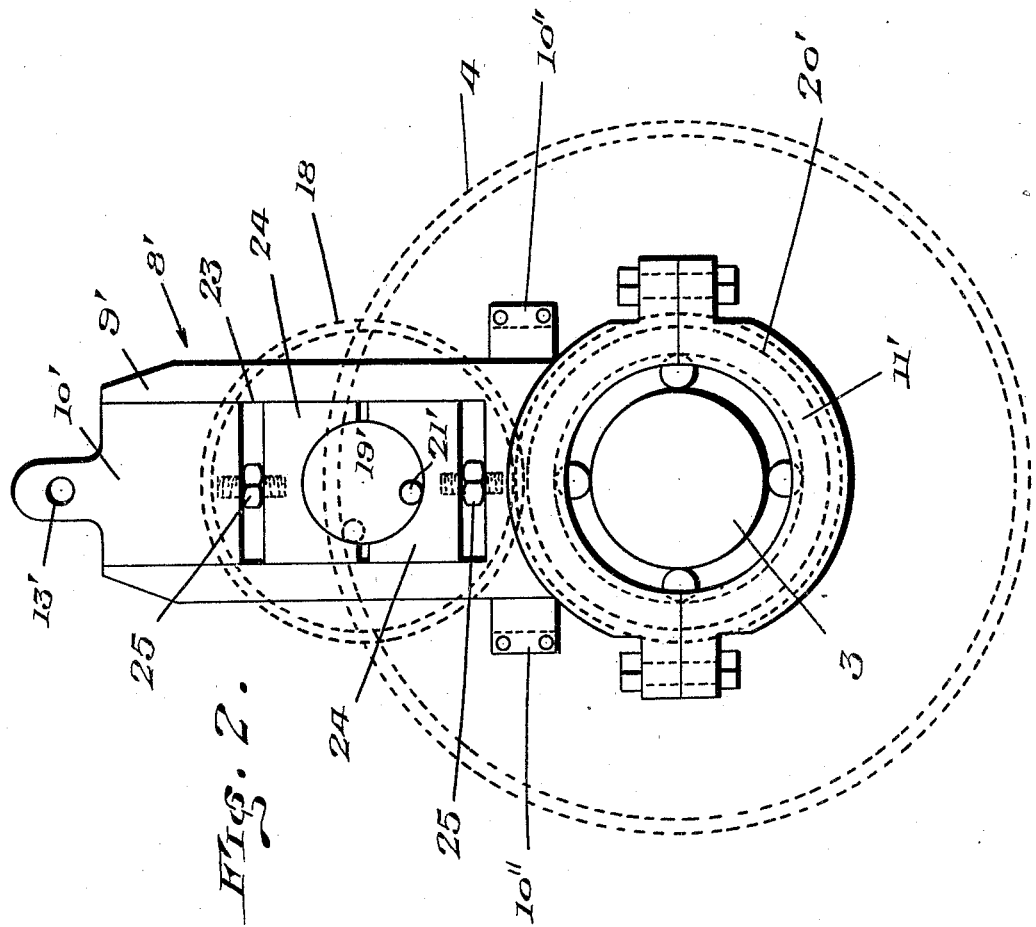

UNITED STATES PATENT OFFICE.

HARTLEY O. BAKER, OF PUEBLO, COLORADO, ASSIGNOR TO THE BAKER STEAM MOTOR CAR AND MANUFACTURING CO., INC., OF PUEBLO, COLORADO.

VALVE-GEAR.

1,395,331.  Specification of Letters Patent.  Patented Nov. 1, 1921.

Application filed March 17, 1919. Serial No. 283,220.

*To all whom it may concern:*

Be it known that I, HARTLEY O. BAKER, a citizen of the United States, residing at Pueblo, in the county of Pueblo and State of Colorado, have invented certain new and useful Improvements in Valve-Gears; and I do hereby declare the following to be a full, clear, and exact description of the invention, such as will enable others skilled in the art to which it appertains to make and use the same.

The present invention relates to valve gears for use primarily in steam or pressure fluid engines, and aims to provide a novel and improved valve gear for use on the steam engines of automobiles and elsewhere for which the mechanism is suitable.

It is the object of the invention to provide a comparatively simple, inexpensive and compact mechanism that can be mounted on and operated from the engine crank shaft or the like, and which can be quickly adjusted to vary the lead of the engine valves, or adjusted to shift the position of the valves to reverse the engine.

A further object is the provision of such a mechanism embodying a novel construction and assemblage of the component elements in order that the mechanism can be conveniently mounted on and operated from the engine crank shaft, or the like, and will efficiently serve its office.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:

Figure 1 is a rear view of the device, portions being shown in section.

Fig. 2 is a side elevation thereof.

The gear 4 of the crank shaft 3 is located at the center and the arm 8' is disposed astride the gear 4 and embodies opposite side plates 9' having split bearings 11' at their inner ends mounted for rotation of the crank shaft 3 and rollers can be used for reducing friction as shown. Supplementary plate 9'' are disposed between the plates 9' at opposite sides of the gear 4 and terminate short of the shaft 3 at their inner ends, and the outer ends of the plates 9' and 9'' are secured to a yoke 10', while the inner ends of the plates 9'' are fastened rigidly to the plates 9' by means of spacers 10'' thereby making the parts of the arm rigid. The yoke 10' has an apertured ear 13' or the like for the connection of the operating rod or bar to swing the arm 8' for oscillation forwardly and rearwardly. A separate valve operating gear 18 is used for each valve, and the gears 18 are mounted between the plates 9' and 9'' at the opposite sides of the gear 4, said gears 18 having bosses 19' mounted for rotation in said plates. The gears 18 mesh with individual gears 20' secured on the crank shaft at opposite sides of the gear 4. This permits the gears to be adjusted or set individually, and also enables the gear 4 to be located at the center. The opposite bosses 19' have the outstanding wrist pins 21' for operating the valve rods. The bosses or hubs of the gear 18 are provided with adjustable bearings, and for this purpose the plates 9' and 9'' have openings or slots 23 in which the bearings 24 are disposed, said bearings being divided or split, and each having two sections between which the respective boss 19' is journaled. The sections of the bearings are adjusted by means of right and left screw threaded adjusting members 25 threadedly engaging the plates at the opposite ends of the openings 23 and also threadedly engaging the sections of the bearings.

In operation, it is evident that the gears 18 are rotated by the gears 20', thus reciprocating the valve rods which engage the wrist pins 21', and by swinging the arm 8' in one direction or the other, the gears 18 will have a planetary motion around the gears 20' to change the lead of the valves (not shown). Furthermore, by swinging the arm 8' to reverse positions, this will rotate the gears 18 through one half of a revolution, to reverse the operation of the valves and change the direction of operation of the engine, as well known.

Having thus described the invention, what is claimed as new is:

1. A valve gear embodying in combination with a shaft and a driving gear thereon, an arm disposed astride said gear and having pairs of plates at opposite sides of said gear, some of which have bearings journaled on said shaft, valve operating gears at opposite sides of said gear disposed between the plates of said arm and having bosses on opposite sides mounted for rotation in said plates, said bosses having opposite valve operating wrist pins, and gears secured on the shaft within the arm at opposite sides of the driving gear and meshing with the valve operating gears.

2. A valve gear embodying in combination with a shaft and a driving gear thereon, an arm disposed astride said gear and having a yoke at its outer end and a pair of plates at each side of said gear extending toward said shaft, one plate of each pair having a bearing journaled on said shaft at the corresponding side of said gear, valve operating gears at opposite sides of said gear disposed between the plates of said pairs, adjustable bearings mounted in said plates, the valve operating gears having bosses mounted for rotation in said bearings, said bosses having opposite valve operating wrist pins, and gears secured on said shaft within said arm at the opposite sides of the driving gear and meshing with the valve operating gears.

3. A valve gear embodying in combination with a shaft and a driving gear thereon, an arm mounted for turning movement on said shaft, and having a pair of spaced plates each having a slot, split bearings adjustably mounted in said slots, a valve operating gear disposed between said plates and having opposite bosses mounted for rotation in said bearings, a wrist pin carried by one boss, means between the ends of said slots and bearing for adjusting the sections thereof, and a gear secured on said shaft and meshing with said valve operating gear.

In testimony whereof I have signed my name to this application in the presence of two subscribing witnesses.

HARTLEY O. BAKER.

Witnesses:
P. S. BROWN,
FRONIE ABELL.